United States Patent [19]

Morishita et al.

[11] Patent Number: 4,925,283
[45] Date of Patent: May 15, 1990

[54] OBJECTIVE LENS FOR OPTICAL MEMORY DEVICE

[75] Inventors: Ichiro Morishita, Iwanuma; Hiroko Hanzawa, Shiroishi, both of Japan

[73] Assignee: Alps Electric Co., Ltd., Tokyo, Japan

[21] Appl. No.: 388,797

[22] Filed: Aug. 2, 1989

[30] Foreign Application Priority Data

Oct. 11, 1988 [JP] Japan .................................. 63-256783

[51] Int. Cl.$^5$ ............................................ G02B 13/18
[52] U.S. Cl. ........................................................ 350/432
[58] Field of Search ..................................... 350/432–435

[56] References Cited

U.S. PATENT DOCUMENTS

| | | | |
|---|---|---|---|
| 4,571,034 | 2/1986 | Nakamura | 350/432 |
| 4,595,264 | 6/1986 | Nakamura | 350/432 X |
| 4,657,352 | 4/1987 | Suda et al. | 350/432 |
| 4,668,055 | 5/1987 | Nishi et al. | 350/432 |
| 4,863,248 | 9/1989 | Saka | 350/432 |

Primary Examiner—Scott J. Sugarman
Attorney, Agent, or Firm—Guy W. Shoup

[57] ABSTRACT

An objective lens for an optical memory device comprising a plane surface on one side thereof for emitting a luminous flux oppositely to a disk, and an aspherical surface on the other of the side thereof for receiving a luminous flux reversely to the disk in such a manner that the following conditions (1) and (2) are satisfied:

$$1.69 \leq n \leq 1.74 \qquad (1)$$

$$n - 1 \geq (n_C - n_{A'})/0.00056 \qquad (2)$$

where n is a refractive index of a lens medium for the wavelength of an incident light, $n_{A'}$ is a refractive index of a lens medium for A' beam (768.2 nm of wavelength) of a reference light beam, and $n_C$ is a refractive index of a lens medium for a C beam (656.3 nm of wavelength). Thus, the lens can sufficiently obtain the thickness of the periphery thereof, has a plenty of utility in light weight, and can follow a variation in a laser wavelength due to the switching of the emitting light power of a semiconductor laser.

1 Claim, 3 Drawing Sheets

OBJECTIVE LENS FOR OPTICAL MEMORY DEVICE

BACKGROUND OF THE INVENTION

1. Field of the Invention

This invention relates to an objective lens for use in an optical memory device for writing and reading by a laser and, more particularly, to an objective lens for an optical memory device having preferable chromatic aberration and a plenty of utility.

2. Description of the Prior Art

An objective lens having an aspherical surface on one side and a plane surface on the other side for use in an optical disk device is disclosed, for example, in Japanese Patent Application Laid-open No. 88213/1986. If a refractive index is determined in the lens having an aspherical surface on one side and a plane surface on the other side of this type, its central thickness and a variation in its aspherical surface are automatically determined when its sine conditions and spherical aberration are corrected.

In the objective lens disclosed in said Japanese Patent Application Laid-open No. 88213/1986, its refraction index n has a condition of n>1.68. However, assume, for example, that the lens has a condition of n>1.68, the thickness of the periphery of the lens becomes excessively thin, and, when it is adhered with an adhesive, there is a possibility that a distortion is affected in an effective diameter from the periphery of the lens.

Further, in the conventional objective lenses including the lens disclosed in the above-described laid-open application, a countermeasure for its chromatic aberration is not considered in case of manufacturing the lens.

In an optical memory device, an emitting light power in case of writing information on a disk and an emitting light power in case of reading information from the disk are switched. Normally, the emitting light power in case of writing is approx. 30 mW, and the emitting light power in case of reading is approx. 3 mW. However, in a semiconductor laser realized at present, a variation in the wavelength of approx. ±5 nm occurs upon switching of the emitting light power. When the wavelength is varied in this manner, a variation in its focal distance occurs due to the difference of the wavelengths in case of switching from the reading to the writing or vice versa, and its focus servo is offset so that there arises a problem that the servo becomes impossible in operation.

SUMMARY OF THE INVENTION

Accordingly, an object of this invention is to provide an objective lens for an optical memory device which can eliminate the above-mentioned problems and which can sufficiently obtain the thickness of the periphery thereof, has a plenty of utility in light weight, and can follow a variation in a laser wavelength due to the switching of the emitting light power of a semiconductor laser.

In order to achieve the above and other objects of the invention, there is provided according to the present invention an objective lens for an optical memory device comprising a plane surface on one side thereof for emitting a luminous flux oppositely to a disk, and an aspherical surface on the other side thereof for receiving a luminous flux reversely to the disk in such a manner that the following conditions (1) and (2) are satisfied:

$$1.69 \leq n \leq 1.74 \qquad (1)$$

$$n - 1 \geq (n_C - n_{A'})/0.00056 \qquad (2)$$

where n is a refractive index of a lens medium for the wavelength of an incident light, $n_{A'}$ is a refractive index of a lens medium for A' beam (768.2 nm of wavelength) of a reference light beam, and $n_C$ is a refractive index of a lens medium for a C beam (656.3 nm of wavelength).

The above and other related objects and features of the invention will be apparent from a reading of the following description of the disclosure found in the accompanying drawings and the novelty thereof pointed out in the appended claim.

DESCRIPTION OF THE PREFERRED EMBODIMENTS

An embodiment of the present invention will be described in detail with reference to the accompanying drawings.

Figure 2:
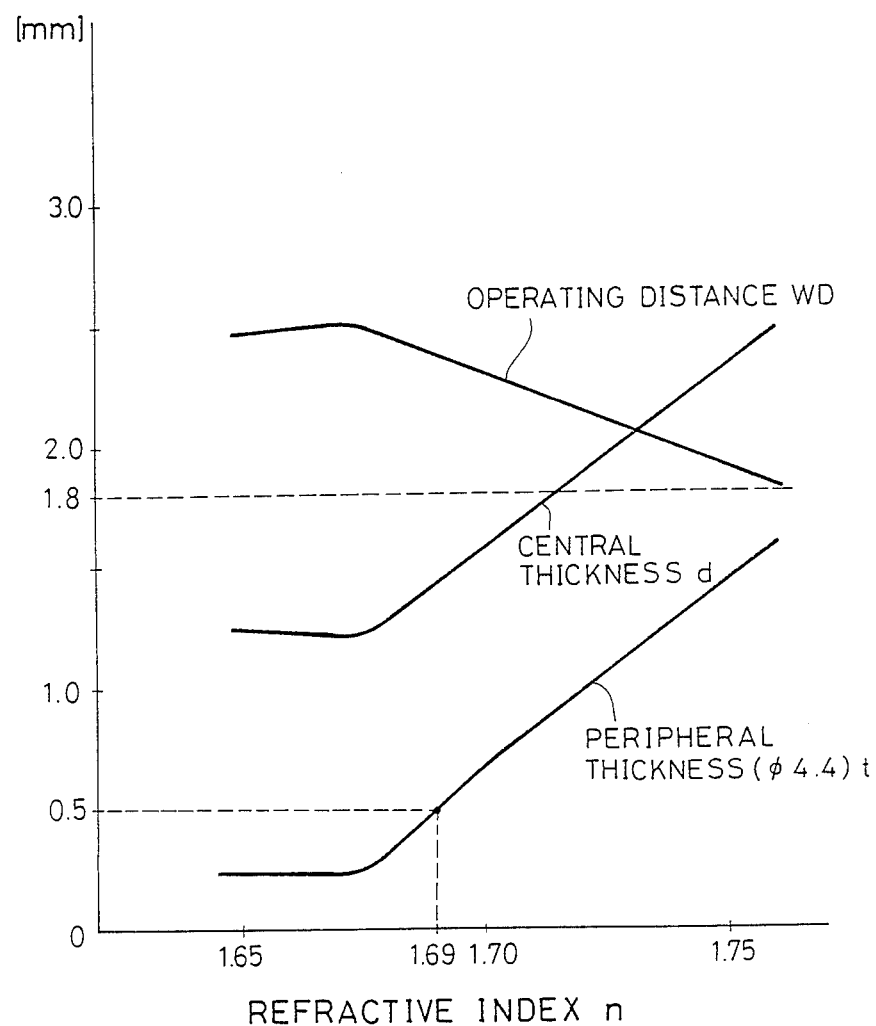
FIG. 2 is a diagram showing the relationship between variations in an operating distance, a central thickness, and a variation in the thickness of the periphery of the lens and a refractive index of the lens.
Figure 3:
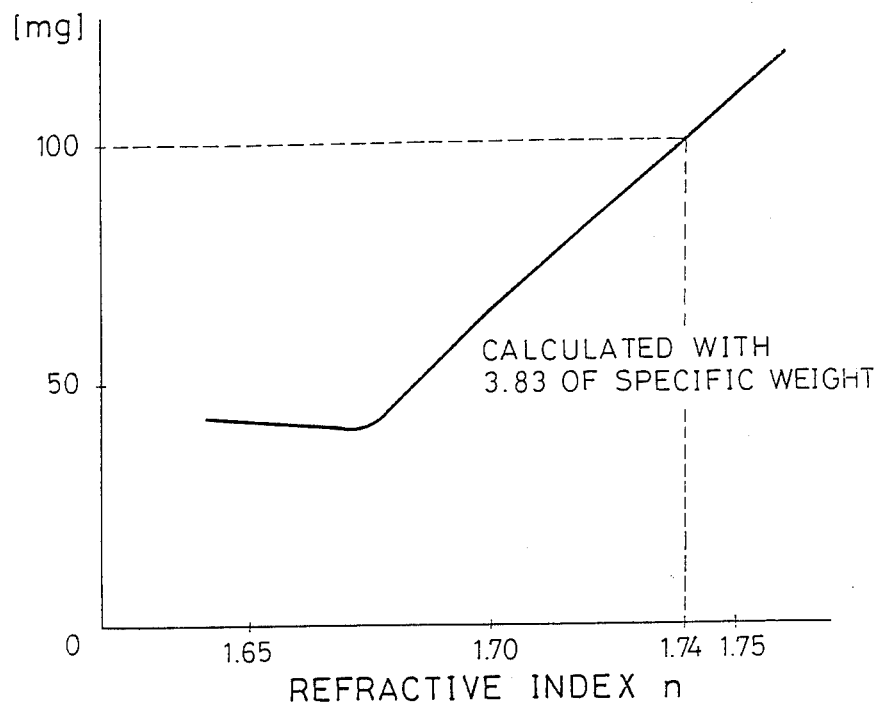
FIG. 3 is a diagram showing the relationship between a variation in the weight of the lens and a refractive index of the lens.

FIG. 2 is a diagram showing the relationship between the peripheral thickness t of a plano-convex lens having an aspherical surface on one side and a plane surface on the other side and the refractive index n of a lens medium by calculating the peripheral thickness t of the lens when the operating distance of the lens is WD, the central thickness is d and the diameter of 4.4 mm. FIG. 3 shows the relationship between the weight (mg) of a plano-convex lens having 4.4 mm of diameter and the refractive index n of the lens medium by obtaining the weight (mg) of the lens with 3.83 of the specific weight of the lens medium by calculating a lens volume from the central thickness of the lens varying in response to the variation in the refractive index of the medium of the lens by assuming that the diameter of the lens is 4.4 mm.

From the graphs in FIGS. 2 and 3, the condition that the peripheral thickness of the lens is proper is first obtained. When the periphery of the lens is secured with an adhesive, the peripheral thickness of the lens must be at lest 0.5 mm or more so as to eliminate the influence of a distortion due to the securing of the lens to the effective diameter. In the diagram in FIG. 2, when a point (a) that the peripheral thickness of the lens becomes 0.5 mm or more is obtained, the refractive index of the lens at this time is 1.69. Therefore, the following condition (1) is required.

$$1.69 \leq n \qquad (1)$$

Here, the oblique luminous flux characteristics of the light incident to the plano-convex lens will be discussed.

Figure 4:
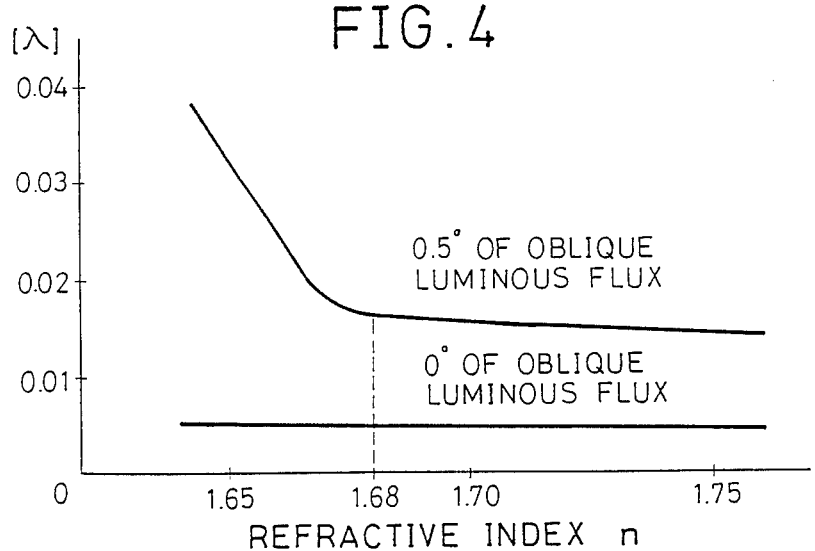
FIG. 4 is a diagram showing the relationship between oblique luminous flux characteristic and a refractive index of the lens.

FIG. 4 shows the relationship between a wavefront aberration (RMS) and a refractive index n when the inclinations of a parallel luminous flux incident to an objective lens are 0° and 0.5°. As understood from FIG. 4, if the refractive index n is 1.68 or more, when the inclination of the parallel luminous flux is 0.5°, the RMS of the wavefront aberration becomes substantially constant. Accordingly, the condition of the above formula (1) is required for the oblique luminous flux characteristic.

Then, in order to realize a high speed access in the objective lens for the optical memory device, it is necessary to reduce in weight not only an objective lens supporting section but an objective lens itself. If the weight of the lens can be reduced to approx. 100 mg or less, it is sufficient to realize a reduction in the weight of a servo movable section in case of composing the optical memory device. According to the graph in FIG. 3, the weight of the lens becomes 100 mg when the refractive index n is set to 1.74. In the diagram in FIG. 2, if the refractive index n is set to 1.74, the operating distance WD can be set to 2.0 mm or more. In the optical memory device, the operating distance WD so that the disk may not be damaged due to the fluctuation of the surface of the disk and the displacement of the servo is approx. 1.8 mm at the minimum. Therefore, if the refractive index n is set to 1.74 or less and the operating distance WD is set to 2 mm or more, it can prevent the disk from damaging.

In order to satisfy both the above conditions of the weight and the operating distance WD, the following formula is required.

$$n \leq 1.74 \quad (2)$$

From the unequality formulae (2) and (1), the following condition is determined.

$$1.69 \leq n \leq 17.4 \quad (1)$$

Then, the condition (2) in the present invention relates to its chromatic aberration, which is the condition formula relating to the dispersion according to the different wavelengths. In the optical memory device as described above, the emitting light powers of the semiconductor laser are switched in case of between writing and reading, and the wavelength of the laser is varied thereby approx. ±5 nm. It is necessary in the objective lens for the optical memory device to eliminate the influence of the variation in the wavelength of the ±5 nm to a focusing servo. When the lens of the aspherical surface is used as a sole objective lens, the variation in the focal distance of the lens to the variation in the wavelength of the laser cannot be absorbed by the correction of the aspherical surface. Accordingly, in the condition formula (2), conditions are imparted to the properties of the glass material for forming the objective lens to suppress the dispersion of the light to the variation in the wavelength. The condition formula (2) will be obtained.

First, when the focal distance of the lens is f, the radius of curvature of the aspherical surface 1a is r and the refractive index is n, the focal distance f of the plano-convex lens is represented by the following formula:

$$f = r/(n-1) \quad (3)$$

The focal distance of the objective lens used for the optical memory device is set to f=4 mm. The refractive index of the lens medium is presumed to be slightly wider range than that of the condition formulae (1) ((1) and (2)), and it is considered in case of n=1.65-1.75. It is necessary in the plano-convex objective lens of the aspherical surface used for the optical memory device to suppress the variation of the focal distance f due to the chromatic aberration of the lens to ±0.001 mm or less. If the focal distance varies more than this value, the lens becomes a defocusing state due to the relation to the focal depth of the lens, and the offset of the focus servo occurs. Then, the allowable variation amount of the refractive index of the lens when the variation of the focal distance when the focal distance is f=4 mm becomes 0.001 mm as described above will be obtained.

First, the case of n=1.65 will be calculated. When n=1.65 and f=4 mm are substituted in the formula (3), the radius of curvature of the aspherical surface lens becomes r=2.6 mm. In this case, assume that the focal distance becomes $f_1 = 4.001$ mm of the allowable limit, the refractive index $n_1$ at this time becomes as below.

$$n_1 = (r/f_1) + 1 = (2.6/4.001) + 1 = 1.64983754$$

That is, the variation amount $\Delta n$ of the refractive index allowed to suppress the variation in the focal distance to 0.001 mm of the allowable limit becomes as below.

$$\Delta n = n_1 - n = 0.0001625$$

In the aspherical surface plano-convex lens having n=1.65 and f=4 mm, in order to suppress the variation in the focal distance to 0.001 nm of allowable limit, it is necessary in the variation in the refractive index to fall within n=0.0001625. Similar calculations are conducted in a range of the refractive index n=1.65-1.75, and listed in the following table.

TABLE

| n | r | $n_1$ | $\Delta n$ |
|---|---|---|---|
| 1.65 | 2.6 | 1.64983754 | 0.0001625 |
| 1.66 | 2.64 | 1.65983504 | 0.0001650 |
| 1.67 | 2.68 | 1.66983254 | 0.0001675 |
| 1.68 | 2.72 | 1.67983004 | 0.0001700 |
| 1.69 | 2.76 | 1.68982754 | 0.0001725 |
| 1.70 | 2.80 | 1.69982504 | 0.0001750 |
| 1.71 | 2.84 | 1.70982254 | 0.0001775 |
| 1.72 | 2.88 | 1.71982005 | 0.0001800 |
| 1.73 | 2.92 | 1.72981755 | 0.0001825 |
| 1.74 | 2.96 | 1.73981505 | 0.0001850 |
| 1.75 | 3.0 | 1.74981255 | 0.0001875 |

In the above table, the variation of the $\Delta n$ when the refractive index n is varied by 0.01 (e.g., 1.66−1.65) is 0.0000025. This variation is the same with respect to the variations in the refractive indices. Accordingly, the variation of the $\Delta n$ when the refractive index is any of those in the above table is as below.

$$(n - 1.65) \times 0.0000025 \times 100 \quad (4)$$

Accordingly, the value of the $\Delta n$ in case of the arbitrary refractive index in the table becomes as below from the formula (4) with the $\Delta n = 0.0001625$ in case of n=1.65.

$$\Delta n = 0.0001625 + (n - 1.64) \times 0.0000025 \times 100 = 0.00025(n-1) \quad (5)$$

This formula (5) is the condition formula so that the variation of the focal distance f becomes 0.001 mm when the wavelength of the laser is varied 5 nm by the switching of the emitting light power of the semiconductor laser. In order to further generalize this formula, the formula (5) is transformed to correspond to the difference of the wavelength $(\lambda_{A'} - \lambda_C) = 111.0$ nm of the wavelengths $\lambda_{A'} = 768.2$ nm of the A' beam of reference light beam and $\lambda_C = 656.3$ nm of the C beam. Since the formula (5) designates the varied allowable value $\Delta n$ of the n when the variation in the wavelength is 5 nm, when the ratio of the difference $(n_C - n_{A'})$ of the refractive index $n_{A'}$ to the A' beam and the refractive index $n_C$ to the C beam to the $\Delta n$ is obtained in response to the ratio of the wavelengths, the following formula is obtained.

$$(n_C - n_{A'})/\Delta n = 111.9/5$$

From this, the following formula is obtained.

$$(n_C - n_{A'}) = \Delta n \times 111.9/5$$

Here, since the $\Delta n = 0.00025(n-1)$ is satisfied, the following formula is obtained.

$$(n_C - n_{A'}) = 0.00056(n-1)$$

Therefore, in order to suppress the variation in the focal distance to the variation in the laser wavelength within the allowable value, the condition of the following formula is required.

$$(n_C - n_{A'}) \leq 0.00056(n-1)$$

Accordingly, the following condition (2) is obtained.

$$n - 1 \geq (n_C - n_{A'})/0.00056 \quad (2)$$

If this condition is satisfied, when the variation in the wavelength is 5 nm, the variation of the focal distance can be suppressed to 0.001 mm or less.

In the above calculations, the focal distance is set to f=4 mm. However, even if the focal distance is out of the 4 mm, if the condition formula (2) is satisfied, the variation in the focal distance due to the switching of the emitting light power of the semiconductor laser can be suppressed.

EXAMPLE

The examples of the present invention will be described.

Figure 1:
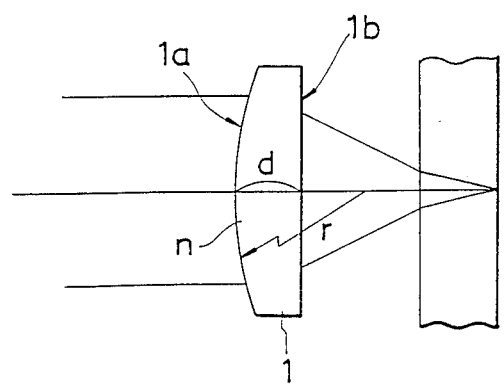
FIG. 1 is a sectional view showing an objective lens and a disk according to the present invention.

The following examples are described in the case that, in a plano-convex lens having an aspherical surface 1a of one side and a plan 1b of the other side shown in FIG. 1, the aspherical surface shape is given by the following formula. The following formula is given where its optical axis is an x axis, the radial direction of the lens is a y axis, on the meridional surface of an orthogonal coordinates system having a vertex of the aspherical surface as an origin.

$$x = (y^2/r)/(1 + 1 - (1 + K)(y^2/r^2)) + Ay^4 + By^6 + Cy^8 + Dy^{10}$$

where r is radius of curvature of reference inscribed sphere at the vertex of the aspherical surface, K is conical constant, A, B, C, D are quarternary, sexanary, octonary and denary expansion coefficients.

In the following examples, n is refractive index, and d is the central thickness mm of the lens.

Example 1

$n = 1.69$, $d = 1.4296$, $r = 2.76$,
$K = -0.300068$
$A = -0.144111 \times 10^{-2}$ $B = -0.146685 \times 10^{-3}$
$C = -0.810956 \times 10^{-5}$ $D = -0.187406 \times 10^{-5}$ Example 2

$n = 1.70$, $d = 1.5860$, $r = 2.80$,
$K = -0.285694$
$A = -0.143985 \times 10^{-2}$ $B = -0.143215 \times 10^{-3}$
$C = -0.798888 \times 10^{-5}$ $D = -0.176560 \times 10^{-5}$ Example 3

$n = 1.71$, $d = 1.7370$, $r = 2.84$,
$K = -0.270571$
$A = -0.144145 \times 10^{-2}$ $B = -0.140229 \times 10^{-3}$
$C = -0.785993 \times 10^{-5}$ $D = -0.167297 \times 10^{-5}$ Example 4

$n = 1.72$, $d = 1.8830$, $r = 2.88$,
$K = -0.254381$
$A = -0.144719 \times 10^{-2}$ $B = -0.137841 \times 10^{-3}$
$C = -0.772499 \times 10^{-5}$ $D = -0.159751 \times 10^{-5}$ Example 5

$n = 1.73$, $d = 2.0243$, $r = 2.92$,
$K = -0.238529$
$A = -0.144946 \times 10^{-2}$ $B = -0.135254 \times 10^{-3}$
$C = -0.758721 \times 10^{-5}$ $D = -0.152156 \times 10^{-5}$ Example 6

$n = 1.74$, $d = 2.1613$, $r = 2.96$,
$K = -0.223311$
$A = -0.144722 \times 10^{-2}$ $B = -0.132356 \times 10^{-3}$
$C = -0.744761 \times 10^{-5}$ $D = -0.144277 \times 10^{-5}$ Example 7

$n = 1.75$, $d = 2.200$, $r = 3.00$,
$K = -0.208312$
$A = -0.146773 \times 10^{-2}$ $B = -0.130142 \times 10^{-3}$
$C = -0.769152 \times 10^{31\,5}$ $D = -0.133531 \times 10^{-5}$ According to the present invention as described above, the peripheral thickness of the lens can be sufficiently obtained, and a light weight lens is provided. Further, the oblique luminous flux characteristics of the lens are improved, and the operating distance of the lens can be sufficient as for the optical memory device.

The objective lens of the invention can allow for its chromatic aberration, and the offset of the focusing servo due to the variation in the wavelength upon switching of the emitting light power of the semiconductor laser at the time of writing and reading is eliminated.

What is claimed is:

1. An objective lens for an optical memory device comprising a plane surface on one side thereof for emitting a luminous flux oppositely to a disk, and an aspherical surface on the other side thereof for receiving a luminous flux reversely to the disk in such a manner that the following conditions (1) and (2) are satisfied:

$$1.69 \leq n \leq 1.74 \quad (1)$$

$$n - 1 \geq (n_C - n_{A'})/0.00056 \quad (2)$$

where n is a refractive index of a lens medium for the wavelength of an incident light, $n_{A'}$ is a refractive index of a lens medium for A' beam (768.2 nm of wavelength) of a refractive light beam, and $n_C$ is a refractive index of a lens medium for a C beam (656.3 nm of wavelength).

* * * * *

UNITED STATES PATENT AND TRADEMARK OFFICE
CERTIFICATE OF CORRECTION

PATENT NO. : 4,925,283

DATED : May 15, 1990

INVENTOR(S) : Ichiro Morishita et al.

It is certified that error appears in the above-identified patent and that said Letters Patent is hereby corrected as shown below:

Title page:

Abstract, Line 4 delete "of the"

Claim 1, Col. 8, Line 8

"refractive" should read --reference--

Signed and Sealed this

Eleventh Day of June, 1991

*Attest:*

HARRY F. MANBECK, JR.

*Attesting Officer*     *Commissioner of Patents and Trademarks*